United States Patent
Teuber et al.

(10) Patent No.: US 6,196,380 B1
(45) Date of Patent: Mar. 6, 2001

(54) APRON-CONVEYOR CHAIN

(75) Inventors: Toralf Teuber, Neufahrn; Peter Grabmann, Sainbach, both of (DE)

(73) Assignee: Joh. Winklhofer & Sohne GmbH & Co. KG, Munich (DE)

( * ) Notice: Subject to any disclaimer, the term of this patent is extended or adjusted under 35 U.S.C. 154(b) by 0 days.

(21) Appl. No.: 09/299,845

(22) Filed: Apr. 26, 1999

(30) Foreign Application Priority Data

Apr. 29, 1998 (DE) .......................................... 298 07 758 U

(51) Int. Cl.$^7$ .................................................. B65G 17/06
(52) U.S. Cl. ............................................ 198/853; 198/851
(58) Field of Search ...................................... 198/853, 851

(56) References Cited

U.S. PATENT DOCUMENTS

| | | | |
|---|---|---|---|
| 2,685,361 | 8/1954 | Garman et al. | 198/181 |
| 3,738,478 | * 6/1973 | Tourtellotte | 198/181 |
| 4,893,709 | * 1/1990 | Schroeder et al. | 198/852 |
| 4,909,381 | * 3/1990 | Stohr | 198/822 |
| 5,404,997 | * 4/1995 | Schreier et al. | 198/779 |

FOREIGN PATENT DOCUMENTS

| | | |
|---|---|---|
| 1049302 | 1/1959 | (DE) . |
| 1056523 | 8/1964 | (DE) . |
| 24 02 242 | 7/1976 | (DE) . |
| 7713782 | 9/1977 | (DE) . |
| 28 22 196 | 11/1979 | (DE) . |
| 01 46 598 | 8/1988 | (EP) . |

* cited by examiner

Primary Examiner—Christopher P. Ellis
Assistant Examiner—Rashmi Sharma
(74) Attorney, Agent, or Firm—Armstrong, Westerman Hattori, McLeland & Naughton

(57) ABSTRACT

An apron-conveyor chain is to be improved, which comprises chain links interconnected at hinge points and transport plates arranged on at least one side of said chain links and provided with a flat transport surface. The hinge points are provided with at least one sleeve and one bolt, and said transport plates form an apron conveyor in common and are each firmly connected to a bolt included in a hinge point. The apron-conveyor chain is in particular characterized by the feature that each transport plate is firmly connected to two neighbouring bolts of two neighbouring hinge points.

12 Claims, 3 Drawing Sheets

APRON-CONVEYOR CHAIN

The present invention refers to an apron-conveyor chain comprising chain links interconnected at hinge points, said hinge points being provided with at least one sleeve and one bolt, and further comprising transport plates arranged on at least one side of said chain links and provided with a flat transport surface, said transport plates forming an apron conveyor in common and being each firmly connected to a bolt included in a hinge point.

Such apron-conveyor chains comprise long chain links, each bolt being connected to a transport plate at a hinge point. For fastening the bolts to the transport plate as stably as possible, the connecting head of the bolt has a diameter which is larger than that of the rest of the bolt. This connecting head is then pressed into a complementary connecting hole of the transport plate. In most cases, the bolt is releasably secured to the chain links with the aid of releasable fastening means, e.g. cotter pins or retainer rings. There are also variants in the case of which the bolt is not a component part of the hinge itself, but is passed through a hollow pin of the outer chain link so that the transport plates can be exchanged without dismounting the chain links. Furthermore, variants are known in the case of which the lower surface of the transport plate is provided with a small guide pin which is guided in an opening of the associated outer or inner link plate so that the transport plate is prevented from rotating excessively about the main fastening bolt. One disadvantage of the hitherto known apron-conveyor chains is to be seen in the fact that great efforts are necessary for arranging the transport plates such that an apron conveyor is formed which is as flat as possible. This necessitates separate alignment processes and exacting manufacturing tolerances. Even small displacements of the transport plates relative to one another or even small angular inaccuracies—because said transport plates are orientated at an oblique angle relative to one another—can result in undesired vibrations and, consequently, disadvantageous effects when objects arranged on the transport surface of the transport plates are conveyed. Since such apronconveyor chains can also be used for conveying objects whose height exceeds their width and length, respectively, said vibrations can cause an excessive amount of unpleasant noise and they may even cause said objects to turn over.

It is therefore the object of the present invention to provide an apron-conveyor chain of the type cited at the start, which provides, in a structurally simple manner, an apron conveyor which is as precise as possible.

According to the present invention, this object is achieved by the feature that each transport plate is firmly connected to two neighbouring bolts of two neighbouring hinge points. The inventor perceived that a main problem of hitherto used apron-conveyor chains is that the connection of the support plate to a single fastening bolt results in undesired manufacturing inaccuracies. Due to the use of two neighbouring bolts for attaching a transport plate, the number of fastening points doubles and, consequently, the possibility of aligning the plate with respect to a fastening point doubles as well. The transport plate is also supported more effectively against forces acting thereon because it is not only provided with a single central support, as has been the case in the prior art. In addition, the second bolt also prevents a rotation of the transport plate about the first fastening point so that a to-and-fro motion of the transport plate, which normally occurs in the prior art, is not caused by the vibration of the chain. The present arrangement is comparatively rigid and therefore subject to little vibration.

As has already been mentioned hereinbefore, another main advantage is, however, that, due to the double fastening by means of the two bolts, the individual transport plates can be aligned with respect to one another more simply and more effectively when they are being produced.

One embodiment can be so conceived that inner chain links and outer chain links are alternately connected to one another, that the inner chain links comprise two inner link plates which are arranged in parallel and two sleeves by means of which said inner link plates are connected, and that the outer chain links comprise two outer link plates which are arranged in parallel and two bolts by means of which said outer link plates are connected, one sleeve of the inner chain link and one bolt of the outer chain link being included in a respective hinge point, and that the length of a transport plate is longer than the length of a chain link. Up to now, long chain links, whose length exceeds that of the transport plates, have always been used for apron-conveyor chains. The reason for this was that the transport plates were always secured to a single bolt. Due to the fastening to two neighbouring bolts of an outer chain link, commercially available flat link articulated chains can be used whose pitch is smaller than the hitherto usual pitch of apron-conveyor chains. This will also reduce the polygon effect, and this will in turn contribute to a quiter running of the chain.

The transport plate can be firmly connected to the two bolts of an outer chain link. This will reduce the number of parts and a compact structural design of the chain will be achieved.

Up to now, it has been common practice that the transport plates of apron-conveyor chains are arranged parallel to an outer link plate of the chain. Due to the fact that the transport plate is now firmly connected to the two bolts of an outer chain link, it is also possible to dispense with an outer link plate at this point completely and to replace said outer link plate by the transport plate. This will save an enormous number of components, whereby the chain according to the present invention can be produced at a very reasonable price.

According to a preferred embodiment, the transport plates can be provided with two holes, an end portion of a bolt being pressed into each of said two holes. This is a connection which can be produced in a simple and precise manner and which offers sufficient alignment possibilities. Such a connection technology proved to be superior to e.g. welding, since alignment errors may occur in the case of this known connection technology.

Bolts for apron-conveyor chains which have been used up to now and which were pressed into the transport plates always had a specially shaped connection head so that the highest possible degree of alignment accuracy could be achieved. Since the alignment is substantially improved due to the fastening at two points, such a structural design is no longer necessary. One variant is therefore so conceived that the bolts have the shape of a cylinder with a uniform diameter. Hence, conventional chain hinge bolts can be used, which do not have any enlarged areas used for pressing in. Only on the opposite side of the transport plate, the outer link plate can still be fastened by riveting the bolt, whereby the diameter of said bolt can be slightly enlarged in the end portion thereof. Such a connection technique can, however, not be applied on the side of the transport plate because the bolt should not project beyond the transport surface. According to a further embodiment, the end portions of the bolts are therefore implemented in such a way that they do not project beyond the transport surface of the transport plates.

One embodiment is so conceived that one end face of the transport plate is provided with a projection having a semicircular edge region which is arranged symmetrically with regard to the centre line of the transport plate and which has a radius that corresponds essentially to half the centre-to-centre distance of the bolts. In addition, the present invention can be so conceived that the other end face of the transport plate is provided with a semicircular recess which is arranged symmetrically with regard to the centre line of the transport plate and in which the semicircular edge region of the projection of the neighbouring transport plate is arranged. This permits a close juxtaposition of the transport plates and it avoids impediments when said transport plates are conducted e.g. round a chain wheel.

Due to the fact that the transport plates must have a certain minimum width for the purpose of transport and each transport plate is secured to two bolts, gaps must inevitably be formed in the transport surface of the apron conveyor so as to prevent the transport plates from striking against each other when the chain goes round a bend, e.g. round a chain wheel. Depending on the intended use and size of the chain, such gaps may constitute a safety risk. Hence, a further embodiment is so conceived that the transport plates are provided with cover regions which are implemented in such a way that they engage a neighbouring transport plate from below and that gaps in the transport surface are essentially covered from below by these regions. This means that the cover regions must be dimensioned e.g. in such a way that it is impossible to put a finger into the gaps between the transport plates. When the cover regions are arranged on the transport plates themselves, it is not necessary to take any additional measures at the guiding structure for the apron-conveyor chain. The cover regions must by implemented such that impediments caused by said cover regions when the apron-conveyor chain goes round a bend are avoided.

Gaps in the transport surface can be covered even more simply making use of an embodiment in which the cover regions are formed by thickness-reducing recesses on the transport surface of the transport plates and in which the transport plate portions engaged from below are provided with corresponding thickness-reducing recesses on the lower surface of the transport plates in which the cover regions are arranged in a substantially aligned mode of arrangement. The transport plates can therefore still have a comparatively small thickness, without an unnecessary amount of space being required for forming the cover regions. Such transport plates can be produced e.g. in such a way that they have a maximum thickness in their fastening area and a suitably reduced thickness in the cover regions and in the regions engaged from below. Such a shape can be produced e.g. also from a plate with a certain thickness by means of metal-cutting forming processes.

A very simple variant is, however, so conceived that the transport plates are defined by two plate elements which are arranged one on top of the other and which have essentially the same structural design, said plate elements being arranged mirror-symmetrically with respect to a symmetry axis, which extends at right angles to the chain axis, so as to define the cover regions and the portions engaged from below. When the transport plates consist e.g. of a steel plate, two thinner plate elements can be produced by blanking and can then be arranged one on top of the other in a mirror-symmetrical arrangement, as has been mentioned hereinbefore. If desired, the plate elements can additionally be fastened by means of welding. The cover regions and the regions engaged from below will then be located at respective points of the transport plate where the two plate elements are not directly superimposed. Since only one and the same shape of plate elements is required for producing transport plates having this type of structural design, this is an extremely economy-priced solution.

In the following, embodiments of the present invention will be explained in detail on the basis of a drawing, in which.

The apron-conveyor chain shown in the figures comprises outer chain links 1 and inner chain links 2 which are alternately arranged on one another and which are interconnected at respective hinge points G.

Figure 3:
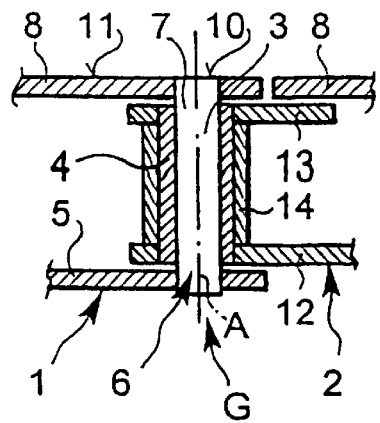
FIG. 3 shows a hinge point of the apron-conveyor chain of FIG. 1 in a fully sectional view.

In particular from FIG. 3, it can be seen that each hinge point G comprises a bolt 3, which is associated with the outer chain link 1, and a sleeve 4, which is associated with the inner chain link 2. The bolt 3 has the shape of a cylinder 3 with an axis A and extends through the opening of the cylindrical sleeve 4 of the inner chain link 2.

The outer chain link 1 additionally comprises an outer link plate 5 which is connected to the end portions 6 of the two bolts 3 of an outer chain link 1 by means of a press fit. The opposed end portions 7 of two bolts 3 of an outer chain link 1 are connected to a transport plate 8 fulfilling the function of the second outer link plate 5 on this side. The respective end portions 7 are received in a hole 9 of the transport plate 8. The end faces 10 on the end portions 7 are essentially flush with the transport surface 11 of the transport plate 8. By arranging the transport plates 8 of the outer chain links 1 in a row, a desired apron conveyor is formed. In this apron conveyor each transport plate 8 is fixedly connected by means of the two bolts 3 of an outer chain link 1. This is achieved by means of a press fit at the end portions 7 in combination with the hole 9. The transport plate 8 is arranged parallel to the outer link plate 5 and has essentially the same thickness.

The inner chain link 2 essentially comprises two inner link plates 12 and 13, which are arranged in parallel to one another and which are connected by means of the sleeve 4. The sleeve 4 is pressed into suitable bores of the link plates 12 and 13 so that the end faces of the sleeve 4 are flush with the outer surfaces of said link plates 12 and 13. The sleeve 4 and the bolt 3 define a hinge point G so that the inner chain link 2 is adapted to be pivoted about the axis A relative to the outer chain link 1. In the embodiment shown, the outer surface of the sleeve 4 has additionally provided thereon a roller 14 which is rotatably supported and which is provided for reducing the wear at this point. Each inner chain link 2 has associated therewith two sleeves 4. The centre-to-centre distance of the axes of the sleeves 4 corresponds essentially to the centre-to-centre distance of the axes A of the bolts 3 of the outer chain link 1.

Figure 1:
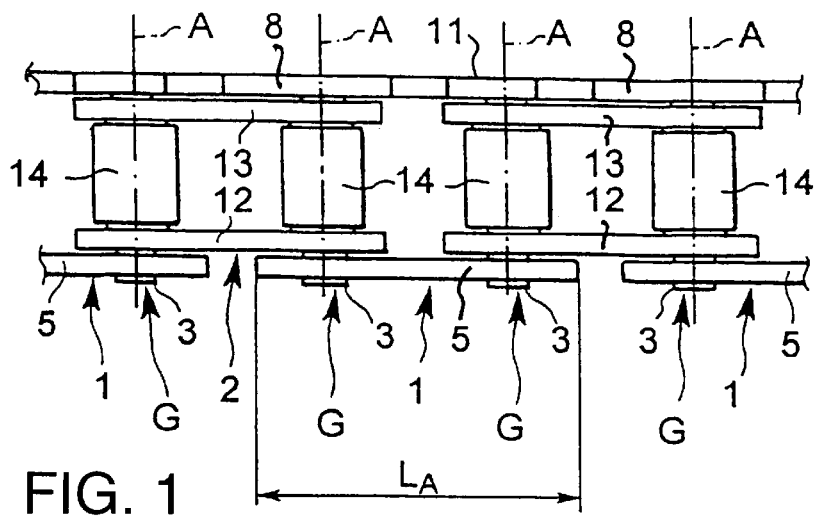
FIG. 1 shows a detail of an apron-conveyor chain in a side view.
Figure 2:
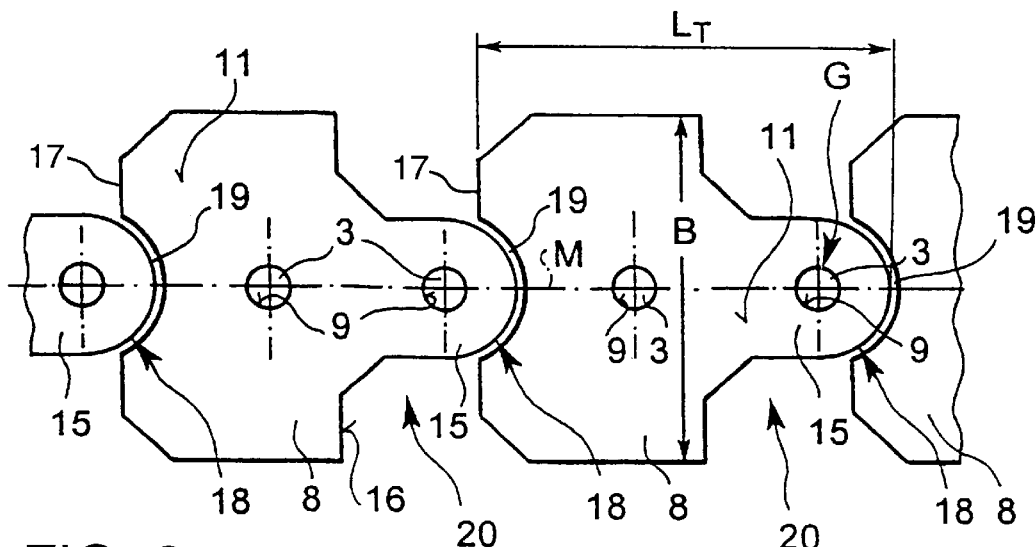
FIG. 2 shows the apron-conveyor chain of FIG. 1 in a top view.

Especially from FIG. 2, it can be seen that each transport plate 8 has a length $L_T$ which is longer than a length $L_A$ of an outer link plate 5. In addition, one end face of the transport plate 8 is provided with a semicircular projection 15 which is symmetric with regard to the central axis M. The projection 15 is smaller than the maximum width B of the transport plate 8. The projection 15 extends over approximately half the overall length $L_T$ of the transport plate 8 and projects beyond the end face 16 correspondingly. One of the hinge points G is located in the area of the projection 15, the axis A defining the centre for the circular arc of the projection 15. The opposite end face 17 is provided with a recess 18 which has the shape of a circular arc and in which the circular-arc section of the projection 15 of the neighbouring transport plate 8 is arranged. A small circular gap 19 remains free. Also the circular-arc configuration of the recess 18 has the axis A of the neighbouring projection 15 as a centre. In order to enable the apron-conveyor chain to go also round sharp bends, a gap 20 is provided between the end face 16 of one transport plate 8 and the end face 17 of the next transport plate 8, said gap serving to accommodate respective movements of the transport plates 8. During future operation, it is possible to bridge or cover these gaps 20 by suitable measures. Strips associated with the lower surface of the transport plates 8 are particularly suitable for covering these gaps. The chain may e.g. move in a suitable C-profile, the transport plates 8 being located outside the C-profile rail and the C-legs covering the respective gap 20 from below.

In the following, the mode of operation of the above-described embodiment will be explained in detail.

Due to the fact that a transport plate 8 is secured to the two bolts 3 of the same outer chain link 1, a high mounting accuracy of the transport plate 8 is obtained. It follows that, in comparison with the prior art, alignment errors are substantially minimized, since the transport plate 8 is supported at two spaced fastening points. In addition, the number of parts is not increased in comparison with a conventional roller chain, since the transport plate 8 fulfills simultaneously the function of one of the outer link plates. This has also the effect that the overall height of the apron-conveyor chain is reduced. On the basis of the above-described embodiment, an apron-conveyor chain is obtained, which comprises a very good, flat transport surface 11. In particular, alignment errors and angular inaccuracies are minimized to a very large extent due to the fact that each transport plate 8 is fastened twice.

Figure 5:
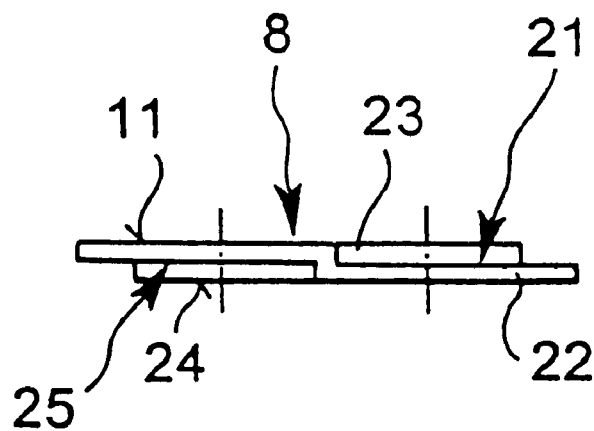
FIG. 5 shows a transport plate of the chain of FIG. 4 in a side view.
Figure 6:
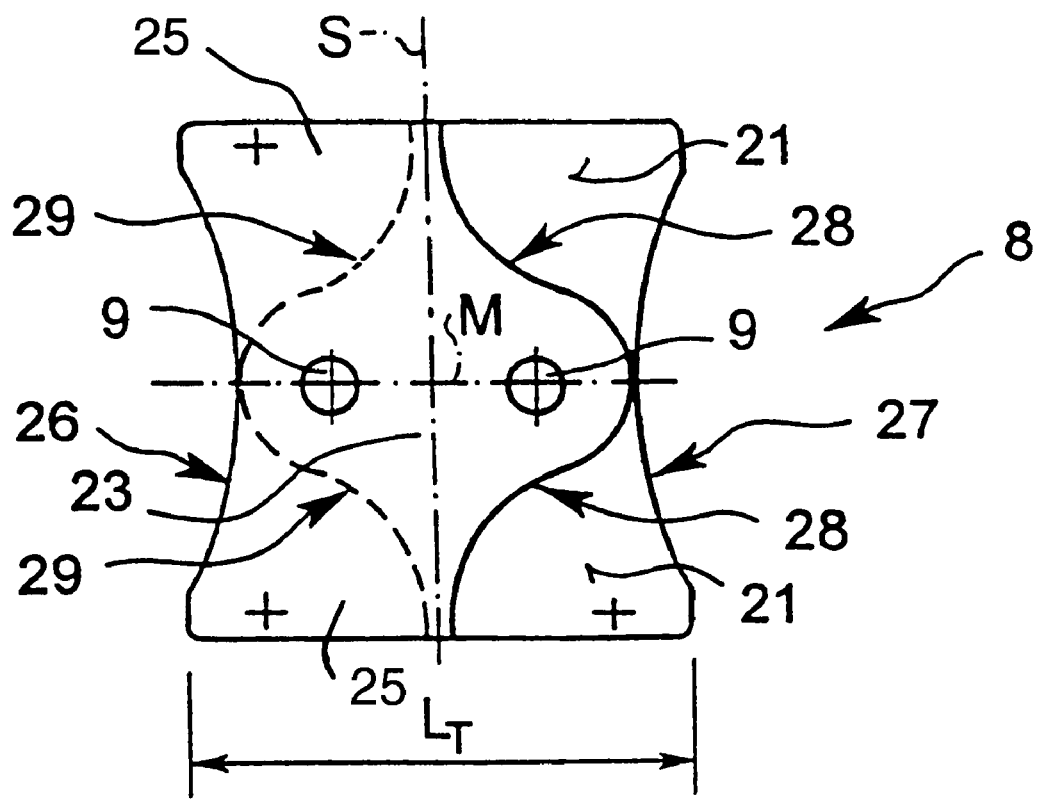
FIG. 6 shows the transport plate of FIG. 5 in a top view.

On the basis of FIGS. 4 to 6, a second embodiment of the apron-conveyor chain will be explained in detail. As far as reference is made to identical components, the same reference numerals as in the case of the preceding embodiment will be used and the above description will be referred to.

This second embodiment differs from the first one mainly with regard to the structural design of the transport plates 8. The transport plate is still provided with holes 9 which rest firmly on the end portions of the bolts 3. When the transport plate 8 is seen in a side view, as in the case of FIG. 5, it can be discerned that the transport surface 11 thereof is not a continuous surface, but that thickness-re-ducing recesses 21 are formed above and below the centre line M. The residual rest of the transport plate, which forms the base 22 of the recess 21, is slightly thinner than half the thickness of the overall thickness of the transport plate 8. The central area 23 of the transport plate 8, which comprises the two holes 9, has the complete thickness of the transport plate 8. Also on the back 24 of the transport plate 8 recesses 25 are formed above and below the centre line M, said recesses being arranged mirror-symmetrically with respect to a mirror axis S intersecting the centre line M at right angles. A look at FIG. 6 shows very clearly that the recesses 21, which are located on the right-hand side of the symmetry axis S in FIG. 6, are open towards the top surface of the transport plate 8, whereas the recesses 25, which are arranged on the left-hand side of the symmetry axis S above and below the centre line M, are open towards the back 24 of the transport plate 8.

When seen in a top view (cf. FIG. 6), said transport plate 8 consists of a rectangular basic element, the lateral edges 26 and 27, which face the respective neighbouring transport plate 8, being each provided with a segment-shaped recess. The recesses 21 are delimited by a substantially S-shaped lateral edge 28 towards the thicker central area 23 of the transport plate 8. The recess 25 provided on the back 24 is delimited by means of the S-shaped curved lateral edges 29 in a similar manner.

Figure 4:
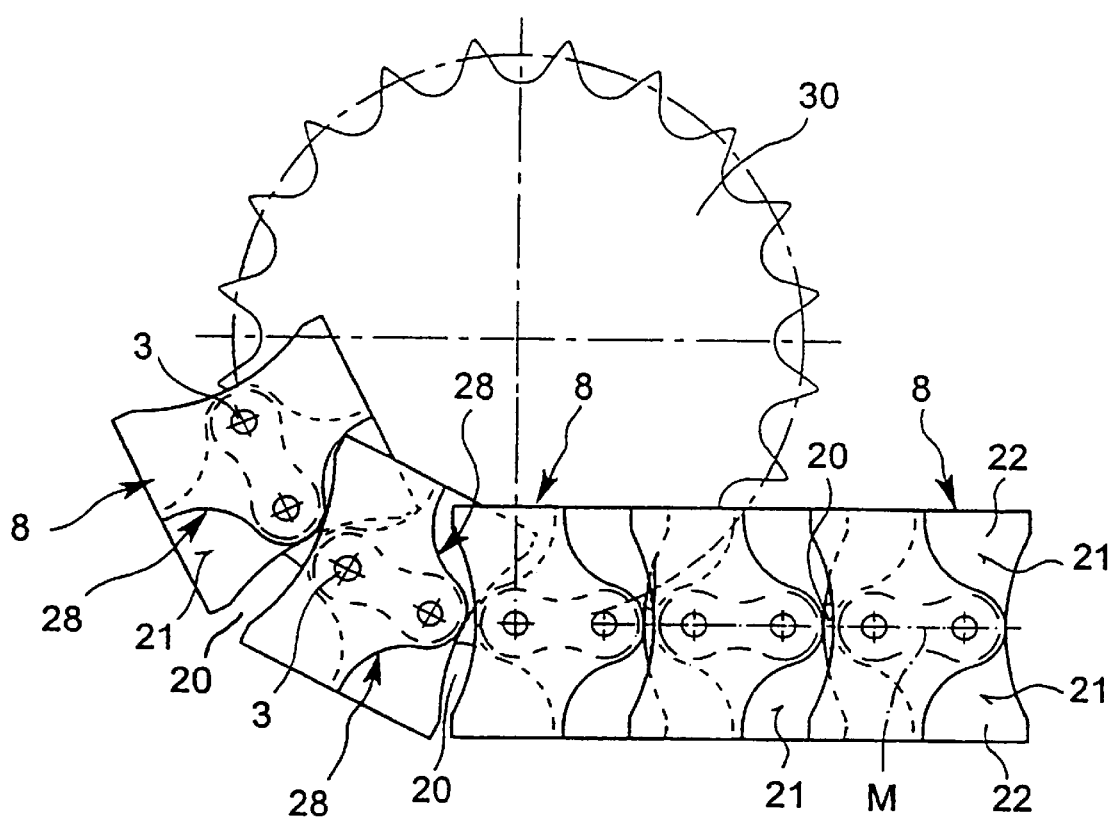
FIG. 4 shows a second embodiment of an apron-conveyor chain in the area of a chain wheel in a top view.

From FIG. 4 it can be seen that the bases 22 formed by the recesses 21 engage the recesses 25 provided on the back 24 so that the transport plates 8 are arranged one on top of the other in certain areas thereof. Since the recesses 21 and 25 have a suitable depth, this will not cause any alignment problems. A small gap 20 between the individual transport plates 8 only remains in the central area, when the apron-conveyor chain is conducted along a straight line. When the apron-conveyor chain is conducted round a chain wheel 30, it can additionally be seen from FIG. 4 that the transport plates 8 pivot relative to one another. This has the effect that the base 22 is increasingly introduced into the recess of the neighbouring transport plate 8 until further pivoting is prevented by the recesses 21, 25 (provided that the smallest possible chain wheel is used, as can be seen in FIG. 4). The recesses 21 and 25 on the opposite sides of the associated transport plates 8 come out of engagement so that a larger gap 20 will be formed. This gap 20 is, however, still so small that it satisfies all requirements with regard to a minimization of the risk of injuries.

From the above, it can be seen that the shape of the recesses 21 and 25 and the contour of the lateral edges 26 and 27 as well as of the lateral edges 28 and 29 must be adapted to one another so that a respective desired pivotal movement of the transport plates 8 is possible while maintaining the largest possible transport surface 11.

On the basis of the figures, it can also be assumed that, instead of being produced from a single component, the transport plate 8 can also be produced from two identically shaped plate elements. These two plate elements are then put one on top of the other such that they are arranged mirror-symmetrically with respect to the symmetry axis S (which is arranged centrally with regard to the holes 9) in such a way that the holes 9 of said plate elements are in alignment with one another. The two plate elements are then pressed onto the end portions 7 of the bolts 3. Previously, such plate elements can be welded together, e.g. by means of spot welding. When identically equipped plate elements are used, a safe apron-conveyor chain can be produced on the basis of the reduced thickness of the individual plates, without any increase in the manufacturing costs which would be worth mentioning.

What is claimed is:

1. An apron-conveyor chain comprising chain links (1, 2) interconnected at hinge points (G), being provided with at least one sleeve (4) and one bolt (3), and further comprising transport plates (8) arranged on at least one side of said chain links (1, 2) and provided with a flat transport surface (11) free of projections, said transport plates (8) forming an apron conveyor in common and being each firmly connected to two neighboring bolts (3) of two neighboring hinge points (G), and adjacent transport plates (8) being provided with mating convex and concave arcuate ends forming a single gap (19) therebetween, the ends having centers substantially coincident with an axis (A) of bolt (3) of a hinge point (G).

2. An apron-conveyor chain according to claim 1, wherein inner chain links (2) and outer chain links (1) are alternately connected to one another, that the inner chain links (2) comprise two inner link plates (12, 13) which are arranged in parallel and two sleeves (4) by means of which said inner link plates are connected, and that the outer chain links (1) comprise two outer link plates (5, 8) which are arranged in parallel and two bolts (3) by means of which said outer link plates are connected, one sleeve (4) of the inner chain link (2) and one bolt (3) of the outer chain link (1) being included in a respective hinge point (G), and that the length ($L_T$) of a transport plate (8) is longer than the length ($L_A$) of an outer link plate (5).

3. An apron-conveyor chain according to claim 1, wherein each transport plate (8) is firmly connected to the two bolts (3) of an outer chain link (1).

4. An apron-conveyor chain according to claim 1, wherein the transport plate (8) replaces one of the outer link plates of a chain link (1).

5. An apron-conveyor chain according to claim 1, wherein the transport plates (8) are provided with two holes (9) and that an end portion (7) of a bolt (3) is pressed into each of said two holes (9).

6. An apron-conveyor chain according to claim 1, wherein the bolts (3) have the shape of a cylinder with a uniform diameter.

7. An apron-conveyor chain according to claim 1, wherein the end portions (7) of the bolts (3) do not project beyond the transport surface (11) of the transport plates (8).

8. An apron-conveyor chain according to claim 1, wherein one end face (16) of the transport plate (8) is provided with a projection (15) with a semicircular edge region, which is arranged symmetrically with regard to the center line (M) of the transport plate (8) and which has a radius that corresponds essentially to half the center-to-center distance of the bolts (3).

9. An apron-conveyor chain according to claim 1, wherein an end face (17) of the transport plate (8) is provided with a semicircular recess (18) which is arranged symmetrically with regard to the center line (M) of the transport plate (8) and in which the semicircular edge region of a projection (15) of the neighboring transport plate (8) is arranged.

10. An apron-conveyor chain according to claim 1, wherein the transport plates (8) are provided with cover regions formed of thickness-reducing recesses (25) which are implemented in such a way that they engage a neighboring transport plate (8) from below and that gaps (20) in the transport surface (11) are essentially covered from below by these regions.

11. An apron-conveyor chain comprising chain links (1, 2) interconnected at hinge points (G), said hinge points (G) being provided with at least one sleeve (4) and one bolt (3), and further comprising transport plates (8) arranged on at least one side of said chain links (1, 2) and provided with a flat transport surface (11), said transport plates (8) forming an apron conveyor in common and being each firmly connected to a bolt (3) included in a hinge point (G), wherein each transport plate (8) is firmly connected to two neighboring bolts (3) of two neighboring hinge points (G), the transport plates (8) are provided with cover regions formed by thickness-reducing recesses (21) on the transport surface (11) of the transport plates (8) and that the transport plate portions engaged from below are provided with corresponding thickness-reducing recesses (25) on a lower surface (24) of the transport plates (8), that gaps (20) in the transport surface (11) are essentially covered from below by these regions, and the cover regions are arranged in a substantially aligned mode of arrangement.

12. An apron-conveyor chain comprising chain links (1, 2) interconnected at hinge points (G), said hinge points (G) being provided with at least one sleeve (4) and one bolt (3), and further comprising transport plates (8) arranged on at least one side of said chain links (1, 2) and provided with a flat transport surface (11), said transport plates (8) forming an apron conveyor in common and being each firmly connected to a bolt (3) included in a hinge point (G), wherein each transport plate (8) is firmly connected to two neighboring bolts (3) of two neighboring hinge points (G), the transport plates (8) are provided with cover regions formed by thickness-reducing recesses (25) which are implemented in such a way that they engage a neighboring transport plate (8) from below and that gaps (20) in the transport surface (11) are essentially covered from below by these regions, and the transport plates (8) are defined by two plate elements (8) which are arranged one on top of the other and which have essentially the same structural design, said plate elements being arranged mirror-symmetrically with respect to a symmetry axis (S), which extends at right angles to the chain axis, so as to define the cover regions and the portions engaged from below.

* * * * *